(No Model.)
R. E. WILSON.
AGRICULTURAL SCRAPER.
No. 484,273. Patented Oct. 11, 1892.
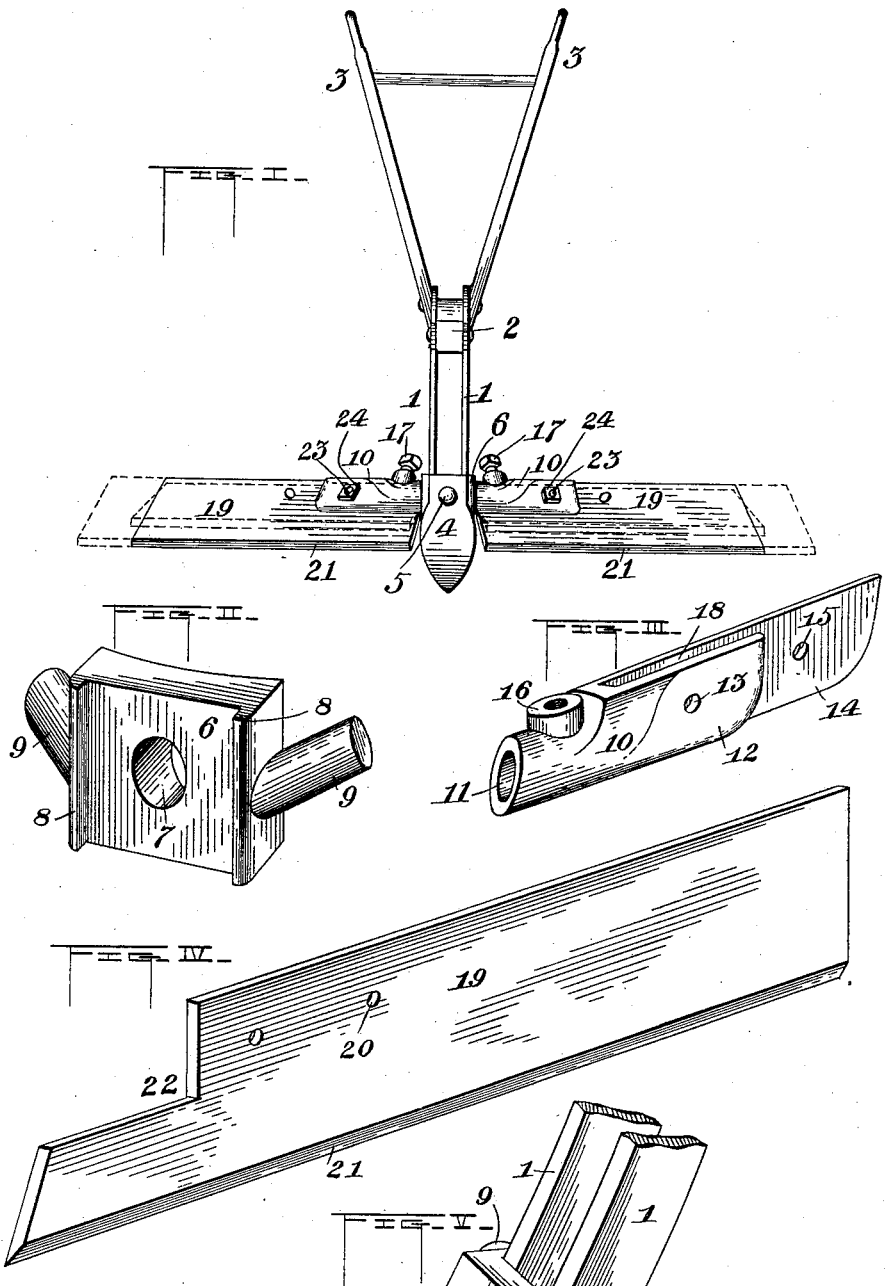

UNITED STATES PATENT OFFICE.

ROBERT E. WILSON, OF UNIONVILLE, GEORGIA.

AGRICULTURAL SCRAPER.

SPECIFICATION forming part of Letters Patent No. 484,273, dated October 11, 1892.

Application filed July 18, 1891. Serial No. 399,960. (No model.)

*To all whom it may concern:*

Be it known that I, ROBERT E. WILSON, a citizen of the United States, and a resident of Unionville, in the county of Monroe and State of Georgia, have invented a new and useful Improvement in Agricultural Scrapers, of which the following is a specification.

My invention relates to an improvement in agricultural scrapers in which cutter-plates forming the wings or blades, instead of being fixed or immovable or welded to or cast with the holder or body, are provided with means to render them adjustable, thus enabling the operator to adjust them so as to present wings or blades of different lengths on opposite sides of the body, and also to arrange them at desired angles, so that a short wing or blade may be used on one side next to the plants being cultivated and a long wing or blade, if necessary, may be used on the opposite side. The scraper is adjusted so that its work may be deep, moderately deep, or shallow, as may be desired, by setting the wings or blades at different angles. Either one or both of the wings or blades can be detached for repairs, and the smith doing the work will only have to handle a wing or blade detached from the holder or body of the scraper, thereby avoiding the trouble and expense of carrying such wings or blades with the body or holder whenever it is necessary to have them sharpened. Sharpening is about the only repair required at times.

My improvement consists in novel features of construction hereinafter described and claimed.

In order that my invention may be fully understood, I will proceed to describe it with reference to the accompanying drawings, in which—

Figure I is a front view of a shovel-plow, showing my improved scraper applied to the standard or stock thereof, the adjustment of the cutter-plates forming wings or blades being indicated by dotted lines. Fig. II is a perspective view of the body or head of the scraper. Fig. III is a perspective view of a holder of the scraper. Fig. IV is a perspective view of a wing of the scraper. Fig. V is a perspective view of the lower end of the standard or stock, showing a modified form of body or head for the scraper.

1 is the standard or stock, 2 is the beam, 3 are the handles, and 4 is the shovel, of a suitable plow. By means of the bolt 5, which secures the shovel to the lower end of the standard or stock, I secure my improved scraper to the rear or front side of the standard or stock. 6 is a body or head applied to the rear side of the standard or stock, having an orifice or hole 7, through which the securing-bolt 5 of the shovel passes, and constructed with flanges 8, extending outward and embracing the standard or stock and with obliquely-arranged round studs 9, forming pivot-bearings for holders 10, which are mounted or journaled thereon. Each holder has a socket 11 to receive a stud 9 and is constructed with a short arm 12, having a bolt-hole 13, with a long arm 14, having bolt-holes 15, and with a projection 16. Through the projection 16 works a set-screw or set-bolt 17, by which the holder is adjusted to the desired angle on its stud. The arms 12 and 14 of each holder form a recess or groove 18, in which is secured the inner end of the adjustable cutter-plate in the form of a wing or blade 19, having bolt-holes 20, registering or coinciding with the bolt-holes of the holder and constructed with a bevel or knife edge 21 and a recess 22 at its inner end, so as to extend beneath the socket portion of the holder close up to the body or head of the scraper.

23 is a bolt, and 24 a nut working thereon, providing means by which the wing or blade is secured to the arms of its holder, the bolt being inserted through the holes of the arms of the holder and passed through the inner hole of the wing or blade if a short cut is desired, or in the outer hole if a longer cut is desired, as indicated in dotted lines in Fig. I. The angle of the bevels or knife-edges of the wings or blades is readily adjusted and fixed by turning the holders on their studs and then securing them by their set-screws or set-bolts.

In the modification shown in Fig. V the body or head of the scraper is secured to the front side of the standard or stock and is located between the shovel and the latter, the position of the flanges of body or head being reversed so as to embrace the standards or stock by extending inwardly instead of outwardly. The bolt-opening in the body or head may be either circular, as shown in Fig. II, or angular, as shown in Fig. V.

Having thus described my invention, the following is what I claim as new therein and desire to secure by Letters Patent:

1. A scraper consisting of a body or head having an obliquely-arranged round stud, a holder mounted on and adjustable on said stud, and a cutter-plate secured adjustably to the holder, substantially as described.

2. A scraper consisting of a body or head having a stud, a holder constructed with arms having bolt-holes and secured to said stud, and a cutter-plate having bolt-holes constructed with a recess fitting the socket portion of the holder and secured to the arms of the holder, substantially as described.

3. The combination of the body or head having obliquely-arranged studs and flanges and adapted to be secured to a standard or stock, the holders having sockets constructed with arms and provided with set-screws or set-bolts and nuts, and the cutter-plates forming wings or blades having bolt-holes and adjustably secured to the arms of the holders, substantially as described.

ROBERT E. WILSON.

Witnesses:
R. B. STEPHENS,
T. B. CABANERS.